United States Patent [19]
Mikami

[11] Patent Number: 5,426,540
[45] Date of Patent: Jun. 20, 1995

[54] DIGITAL AUDIO REPRODUCING APPARATUS

[75] Inventor: Toru Mikami, Higashimurayama, Japan

[73] Assignee: Teac Corporation, Tokyo, Japan

[21] Appl. No.: 84,809

[22] Filed: Jun. 29, 1993

[30] Foreign Application Priority Data

Aug. 7, 1992 [JP] Japan .................................. 4-211786

[51] Int. Cl.$^6$ ............................................. G11B 5/09
[52] U.S. Cl. ..................................................... 360/51
[58] Field of Search ................... 360/46, 32, 51, 53, 360/61, 36.1, 26; 381/29, 34, 38, 51, 52

[56] References Cited

U.S. PATENT DOCUMENTS

| | | | |
|---|---|---|---|
| 4,562,488 | 12/1985 | Kayama et al. | 360/32 X |
| 4,627,090 | 12/1986 | Smith, III et al. | 381/34 X |
| 4,677,621 | 6/1987 | Sato et al. | 360/32 X |
| 4,942,551 | 7/1990 | Klappert et al. | 360/32 |
| 5,105,412 | 4/1992 | Yoshio | 368/48 |
| 5,220,466 | 6/1993 | Coker et al. | 360/51 X |
| 5,233,482 | 8/1993 | Galbraith et al. | 360/32 X |
| 5,243,588 | 9/1993 | Maeda et al. | 360/32 X |

FOREIGN PATENT DOCUMENTS

| | | | |
|---|---|---|---|
| 70596 | of 1986 | Japan | G10L 5/02 |
| 231999 | of 1987 | Japan | G10L 3/02 |
| 138399 | of 1988 | Japan | G10L 3/02 |
| 179097 | of 1989 | Japan | G10L 5/02 |

Primary Examiner—Donald Hajec
Assistant Examiner—Thien Minh Le
Attorney, Agent, or Firm—Michael N. Meller

[57] ABSTRACT

A digital audio reproducing apparatus includes a clock generator for generating a reproducing clock based on a first control signal, a reproducing circuit for reproducing digital audio data from a recording medium which is recorded with the digital audio data at a reproducing speed which is determined by the reproducing clock, a digital signal processor which varies a key of the reproduced digital audio data which is output from the reproducing circuit based on a second control signal, and a controller for generating the first and second control signals in response to an external instruction so that the digital signal processor outputs digital audio data which is reproduced at a desired reproducing speed and key.

11 Claims, 6 Drawing Sheets

DIGITAL AUDIO REPRODUCING APPARATUS

BACKGROUND OF THE INVENTION

The present invention generally relates to digital audio reproducing apparatuses, and more particularly to a digital audio reproducing apparatus such as a compact disk (CD) player, a digital audio tape recorder (DAT) and the like.

Figure 1:
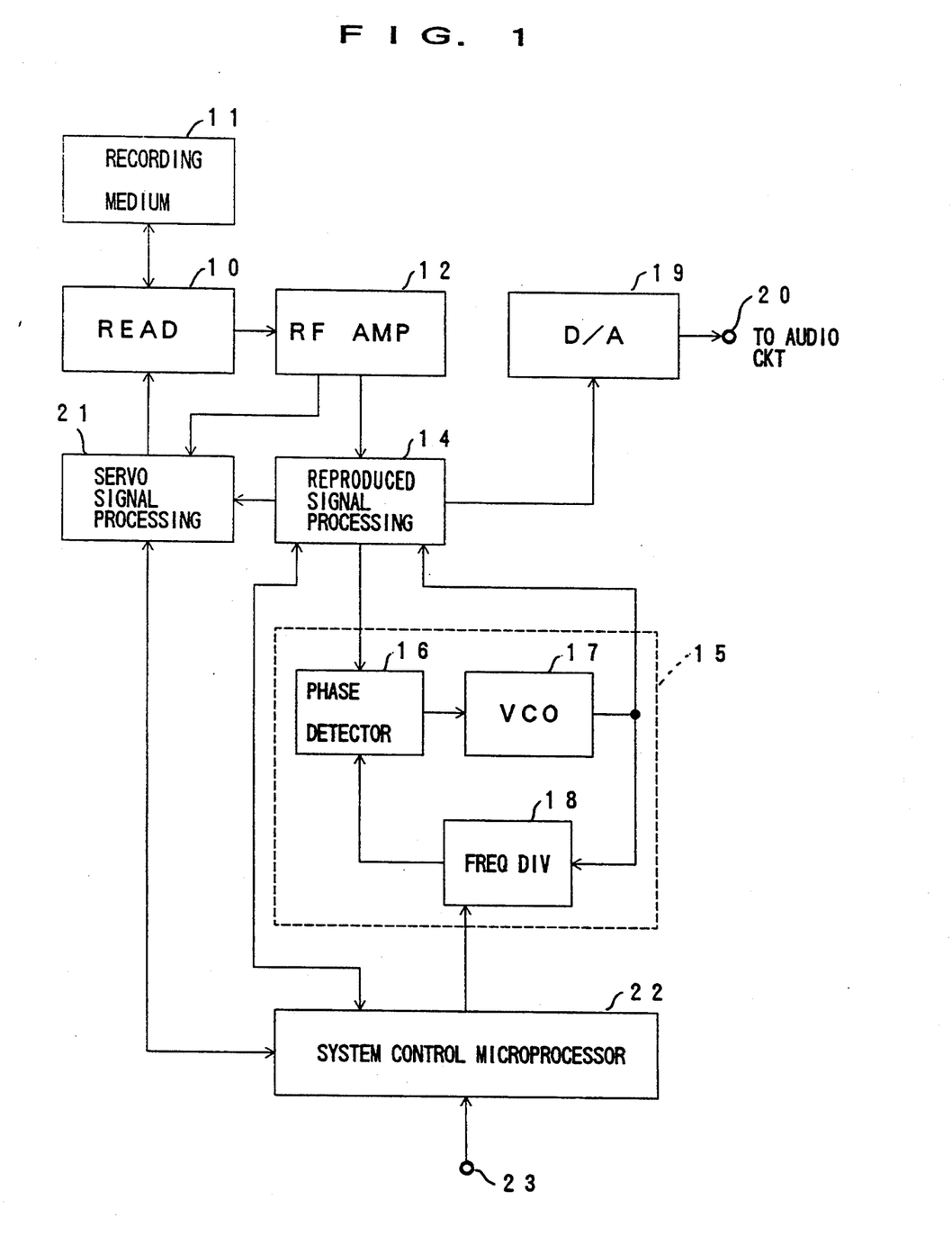
FIG. 1 is a system block diagram showing an example of a conventional CD player.

FIG. 1 shows an example of a conventional CD player. In FIG. 1, a recording medium reading part 10 reads a high-frequency signal which is recorded on a recording medium (CD) 11, and supplies this high-frequency signal to a radio frequency (RF) amplifier 12 wherein the signal is amplified. The amplified high-frequency signal is supplied to a phase detector 16 of a phase locked loop (PLL) circuit 15 via a reproduced signal processing part 14. The PLL circuit 15 includes the phase detector 16, a voltage controller oscillator (VCO) 17 and a frequency dividing circuit 18. The PLL circuit 15 generates a reproducing clock based on the high-frequency signal, and supplies the reproducing clock to the reproduced signal processing part 14.

For example, an integrated circuit (IC) chip CXA1801 may be used for the RF amplifier 12, and an IC chip CXD2500 may be used for the reproduced signal processing part 14, the phase detector 16 and the frequency dividing circuit 18.

The reproduced signal processing part 14 extracts bits of the high-frequency signal using the reproducing clock, demodulates the reproduced signal in frame synchronism, and carries out processes such as interleaving and error correction so as to reproduce digital audio data. The digital audio data is converted into an analog signal in a digital-to-analog (D/A) converter 19, and the analog signal is supplied to an audio circuit (not shown) in the next stage via a terminal 20. In addition, a servo signal processing part 21 carries out a focus servo operation and a tracking servo operation based on the high-frequency signal, and also carries out a spindle servo operation so that the bit clock synchronization is maintained constant.

For example, an IC chip CXA1372 may be used for the servo signal processing part 21.

A system control microprocessor 22 controls the entire operation of the CD player. More particularly, the system control microprocessor 22 instructs the operations of the reproduced signal processing part 14 and the servo signal processing part 21. When an external instruction is supplied to the system control microprocessor 22 via a terminal 23 so as to change the reproducing speed, the system control microprocessor 22 controls the frequency dividing ratio of the frequency dividing circuit 18 within the PLL circuit 15 so as to vary the frequency of the reproducing clock which is output from the VCO 17. As a result, the data transmission rate of the entire CD player changes, and the transmission rate of the digital audio data which is supplied to the D/A converter 19 also changes.

For this reason, if the reproducing speed is varied, the transmission rate of the entire CD player changes and the sampling frequency of the D/A converter 19 also changes. Consequently, there is a problem in that the key (musical interval or step) becomes higher if the reproducing speed of the audio increases. On the other hand, there is a problem in that the key becomes lower if the reproducing speed of the audio decreases.

For example, a Japanese Laid-Open Patent Application No. 62-231999 proposes an apparatus in which a reproducing speed of a reproducing unit and a key conversion of a key conversion unit are controlled simultaneously. In addition, a Japanese Laid-Open Patent Application No. 63-138399 proposes an apparatus in which a relationship between a first rate of change of the key obtained by controlling the reproducing speed of the reproducing unit and a second rate of change of the key obtained by controlling the key conversion unit is set to a value which is determined by a desired reproducing speed and key.

However, although the Japanese Laid-Open Patent Applications No. 62-231999 and No. 63-138399 generally describe the control methods, no specific construction is disclosed therein for realizing the proposed control methods. In other words, no specific circuit constructions are disclosed, and the disclosures seem insufficient for the purposes of realizing the proposed apparatuses.

SUMMARY OF THE INVENTION

Accordingly, it is a general object of the present invention to provide a novel and useful digital audio reproducing apparatus in which the problems described above are eliminated.

Another and more specific object of the present invention is to provide a digital audio reproducing apparatus which can independently vary the speed and key of an audio signal which is output.

Still another object of the present invention is to provide a digital audio reproducing apparatus comprising clock generating means for generating a reproducing clock based on a first control signal, reproducing means, coupled to the clock generating means, for reproducing digital audio data from a recording medium which is recorded with the digital audio data at a reproducing speed which is determined by the reproducing clock, based on the reproducing clock, a digital signal processor, coupled to the reproducing means, varying a key of the reproduced digital audio data which is output from the reproducing means based on a second control signal, and control means, coupled to the clock generating means and the digital signal processor, for generating the first and second control signals in response to an external instruction so that the digital signal processor outputs digital audio data which is reproduced at a desired reproducing speed and key. According to the digital audio reproducing apparatus of the present invention, it is possible to vary the speed (tempo) of only the audio signal which is output, by varying the transmission rate, that is, the speed, of the digital audio data, and varying the key which changes by the change in speed. In addition, it is possible to vary only the key of the audio signal which is output by varying the key without varying the transmission rate.

A further object of the present invention is to provide a digital audio reproducing apparatus comprising clock generating means for generating a reproducing clock, reproducing means, coupled to the clock generating means, for reproducing digital audio data from a recording medium which is recorded with the digital audio data at a reproducing speed which is determined by the reproducing clock, based on the reproducing clock, memory means, coupled to the reproducing means, for writing therein the reproduced digital audio data output from the reproducing means based on a write signal and for reading therefrom the reproduced digital audio data based on a read signal, a digital signal processor, coupled to the memory means, varying a key of the reproduced digital audio data read from the memory means based on a control signal, and control means, coupled to the memory means and the digital signal processor, for generating the write signal, the read signal and the control signal in response to an external instruction so that the digital signal processor outputs digital audio data which is reproduced at a desired reproducing speed and key. According to the digital audio reproducing apparatus of the present invention, if an output clock of a crystal oscillator is used as the reproducing clock and the read speed from the recording medium is maintained constant, it is possible to prevent the read error from increasing even if the reproducing speed is increased.

Other objects and further features of the present invention will be apparent from the following detailed description when read in conjunction with the accompanying drawings.

BRIEF DESCRIPTION OF THE DRAWINGS

FIG. 3 is a diagram showing an embodiment of the arrangement of manipulating buttons of the digital audio reproducing apparatus;

FIG. 4 in parts (A) and (B) is a flow chart for explaining the process of a system control microprocessor;

FIG. 5 in parts (A) and (B) is a flow chart for explaining the process of the system control microprocessor;

FIG. 6 is a diagram showing the relationship between the change in the reproducing speed and the change in the key;

DESCRIPTION OF THE PREFERRED EMBODIMENTS

Figure 2:
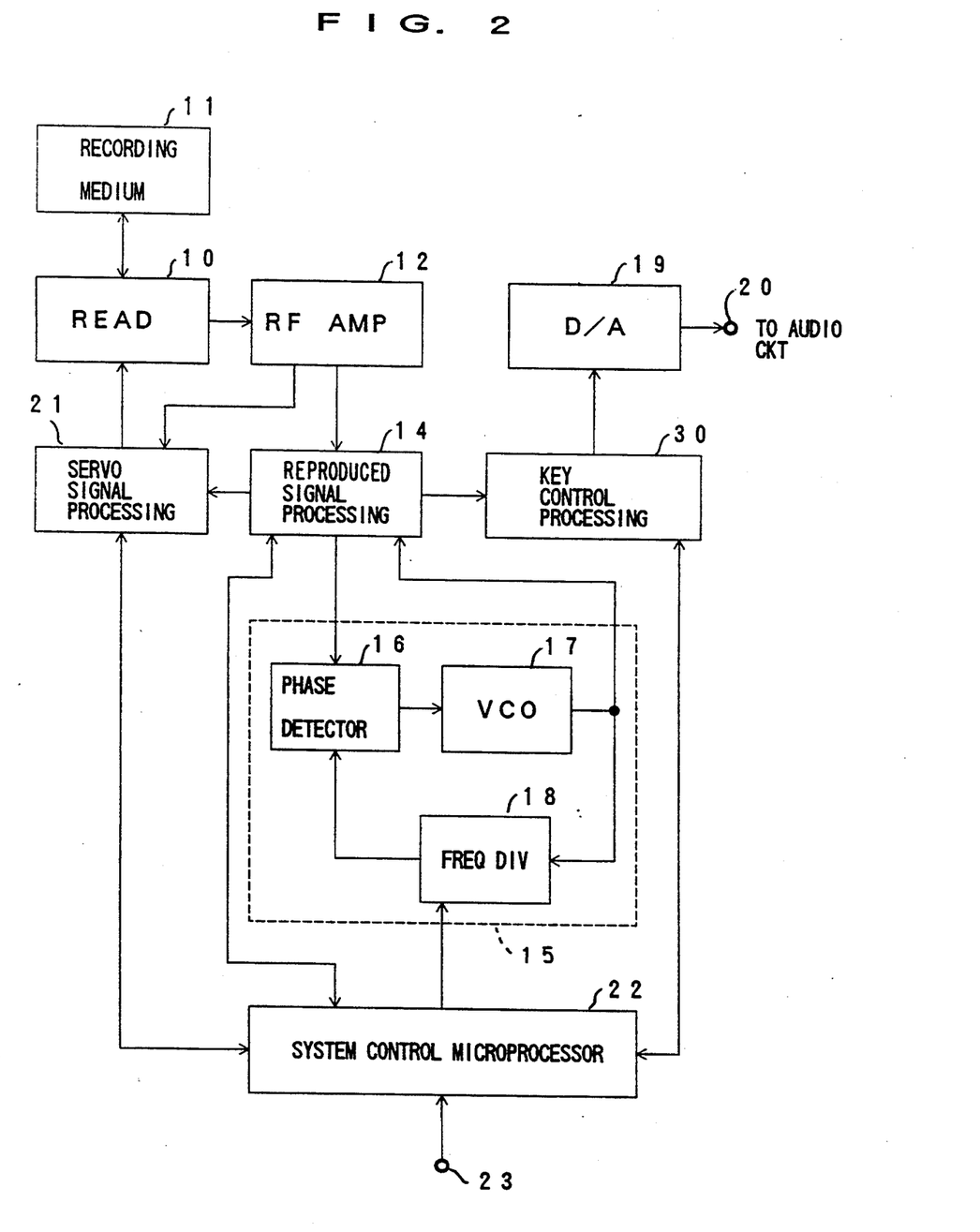
FIG. 2 is a system block diagram showing a first embodiment of a digital audio reproducing apparatus according to the present invention.

FIG. 2 shows a first embodiment of a digital audio reproducing apparatus according to the present invention. In FIG. 2, those parts which are the same as those corresponding parts in FIG. 1 are designated by the same reference numerals, and a description thereof will be omitted. In this embodiment, the present invention is applied to a CD player.

In FIG. 2, the digital audio data output from the reproduced signal processing part 14 is supplied to the D/A converter 19 via a key control processing part 30. For example, the key control processing part 30 is a digital signal processor (DSP) which carries out a digital process depending on the instructions from the system control microprocessor 22, so as to vary the key (musical level or step) of the reproduced audio.

FIG. 3 shows an embodiment of the arrangement of manipulating buttons which are provided on a front panel of the CD player. Each button is coupled to the system control microprocessor 22 via the terminal 23 shown in FIG. 2. In FIG. 3, key control buttons include a flat button 35, a natural button 36 and a sharp button 37. The key can be shifted in units of half tone (or step), that is, 100 cent, regardless of the operation state of the CD player. The key decreases by half tone (100 cent) every time the flat button 35 is pushed once. The key increases by half tone (100 cent) every time the sharp button 37 is pushed once. If the key has been changed, the key is returned to the key at the time of playing the recording medium 11 in the normal reproduction mode of the CD player if the natural button 36 is pushed. The "normal reproduction mode" is a mode in which the digital audio data are reproduced from the recording medium 11 at the same speed and key as those at the time of the recording. In addition, the "key" refers to the musical interval or step for the case where only the musical interval or step is changed.

Pitch/tempo control buttons include a down button 38, a normal button 39 and an up button 40. The pitch or tempo can be changed in units of 1% with reference to those at the time of the normal reproduction of the recording medium 11. The "pitch" refers to a mode in which the key also changes when the reproducing speed of the recording medium 11 is changed. In addition, the "tempo" refers to a mode in which the key does not change even when the reproducing speed of the recording medium 11 is changed. The rate of change of the reproducing clock frequency changes in the negative direction if the down button 38 is pushed, and the reproducing speed at the time of reproducing the recording medium 11 decreases and the key becomes lower or, only the reproducing speed decreases. The rate of change of the reproducing clock frequency changes in the positive direction if the up button 40 is pushed, and the reproducing speed at the time of reproducing the recording medium 11 increases and the key becomes higher or, only the reproducing speed increases. If the pitch or tempo has been changed, the key and the reproducing speed are returned to the those at the time of playing the recording medium 11 in the normal reproduction mode of the CD player if the normal button 39 is pushed.

A mode conversion switch 41 selects whether to change the pitch or the tempo. Manipulation signals output from each of the buttons and switch provided on the front panel are supplied to the system control microprocessor 22 via the terminal 23.

Figure 4A:
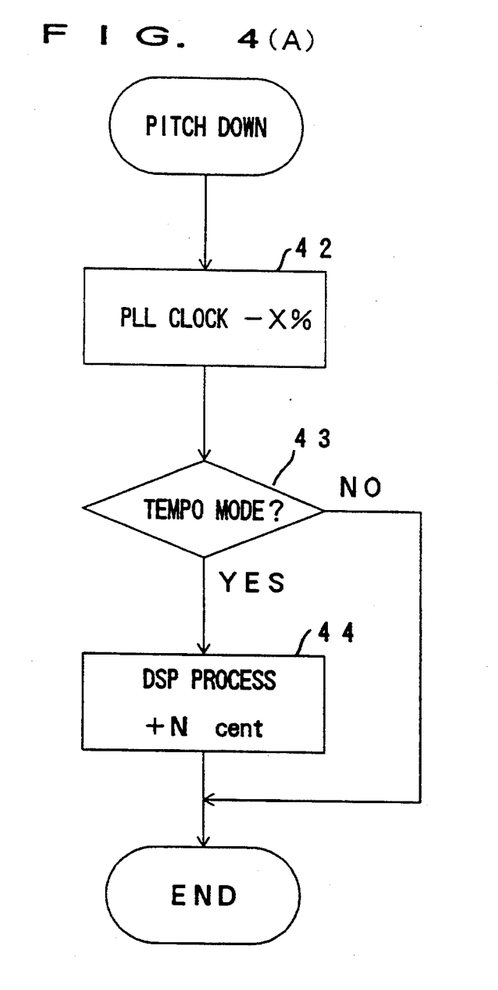
Figure 4B:
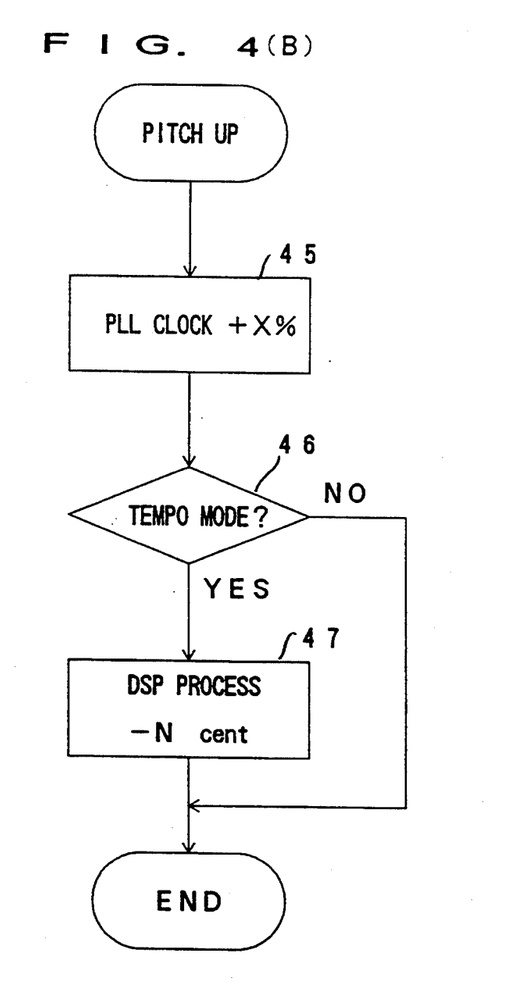
Figure 5A:
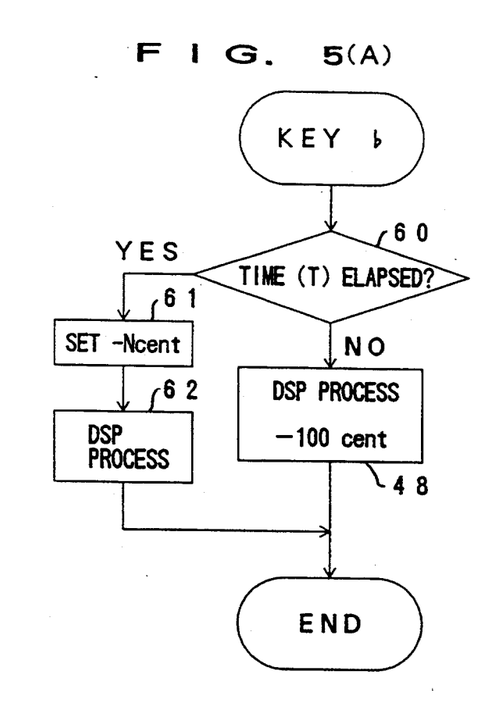
Figure 5B:
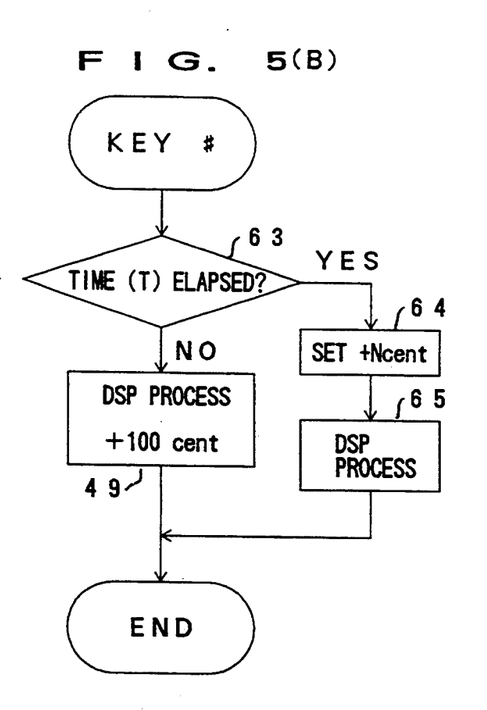

FIGS. 4 and 5 are flow charts for explaining the operations of the system control microprocessor 22 when the manipulation buttons shown in FIG. 3 are manipulated.

FIG. 4(A) shows the flow chart for the case where the reproducing speed of the recording medium 11 is decreased. The process shown in FIG. 4(A) starts when a rate of change −X is set by pushing the down button 38. A step 42 sends an instruction to the PLL circuit 15 based on the setting of the rate of change −X, so as to increase the oscillation period of the clock and to decrease the reproducing speed. A step 43 decides whether or not the tempo mode is selected. The decision of the step 43 is dependent on the selection made by the switch 41. If the pitch mode is selected by the switch 41, the decision result of the step 43 is NO and the process ends. On the other hand, if the tempo mode is selected by the switch 41, the decision result of the step 43 is YES and the process advances to a step 44. The step 44 instructs the key control processing part 30 to carry out a key control process which increases the key by N cent. As a result, the reproducing speed of the recording medium 11 decreases, and the key control process increases only the key by an amount corresponding to the decrease, so that the process ends after carrying out the process of returning the key to the key at the time of the normal reproduction, for example.

FIG. 4(B) shows the flow chart for the case where the reproducing speed of the recording medium is increased. The process shown in FIG. 4(B) starts when a rate of change +X is set by pushing the up button 40. A step 45 sends an instruction to the PLL circuit 15 based on the setting of the rate of change +X, so as to decrease the oscillation period of the clock and to increase the reproducing speed. A step 46 decides whether or not the tempo mode is selected. The decision of the step 46 is dependent on the selection made by the switch 41. If the pitch mode is selected by the switch 41, the decision result of the step 46 is NO and the process ends. On the other hand, if the tempo mode is selected by the switch 41, the decision result of the step 46 is YES and the process advances to a step 47. The step 47 instructs the key control processing part 30 to carry out a key control process which decreases the key by N cent. As a result, the reproducing speed of the recording medium 11 increases, and the key control process decreases only the key by an amount corresponding to the increase, so that the process ends after carrying out the process of returning the key to the, key at the time of the normal reproduction, for example.

FIG. 5(A) shows the flow chart for the case where the key is decreased in units of half tone or 1 cent. If the flat button 35 is pushed, a step 60 decides whether or not a time t1 for which the flat button 35 is pushed is greater than or equal to a predetermined time T. If the decision result in the step 60 is NO, a step 48 sends an instruction to the key control processing part 30 so as to decrease the key by half tone (100 cent). On the other hand, if the decision result in the step 60 is YES, the operation shifts to a mode for changing the key in units of 1 cent. A step 61 sets the key changing quantity to −N cent, and a step 62 sends an instruction to the key control processing part 30 so as to decrease the key by −N cent. In addition, if the key is to be decreased by another half tone or N cent, the flat button 35 is pushed again.

FIG. 5(B) shows the flow chart for the case where the key is increased in units of half tone or 1 cent. If the sharp button 37 is pushed, a step 63 decides whether or not a time t2 for which the sharp button 37 is pushed is greater than or equal to a predetermined time T. If the decision result in the step 63 is NO, a step 49 sends an instruction to the key control processing part 30 so as to increase the key by half tone (100 cent). On the other hand, if the decision result in the step 63 is YES, the operation shifts to a mode for changing the key in units of 1 cent. A step 64 sets the key changing quantity to +N cent, and a step 65 sends an instruction to the key control processing part 30 so as to increase the key by +N cent. In addition, if the key is to be increased by another half tone or N cent, the sharp button 37 is pushed again.

Next, a general description will be given of the key control process.

The relationship between the change of the reproducing speed and the change of the key when reproducing the recording medium 11 becomes as shown in FIG. 6. This relationship is a logarithmic relationship as may be seen from FIG. 6. In other words, the key increases by 1 octave (1200 cent) if the reproducing speed is doubled (rate of change of the reproducing speed is 100%), and the key decreases by 1 octave (1200 cent) if the reproducing speed is multiplied by ½ (rate of change of the reproducing speed is −50%). A key changing quantity N with respect to a multiplying factor n of the reproducing speed may be described by the following formula (1).

$$N = 1200 \cdot (\log n / \log 2) \text{ (cent)} \quad (1)$$

In addition, if the multiplying factor n of the reproducing speed is described by the rate of change X, the following formula (2) is obtained.

$$n = (X/100) + 1 \quad (2)$$

Accordingly, the relationship between the change of the reproducing speed and the change of the key shown in FIG. 6 can be described by the following formula (3).

$$N = 1200 \cdot [\log(X/100 + 1)]/\log 2 \text{ (cent)} \quad (3)$$

More particularly, if the reproducing speed is increased by 10%, for example, the key changing quantity N of the reproduced sound increases by approximately 165 (cent) as may be seen from the formula (4) below. Accordingly, if the audio data of the reproduced signal which is obtained when the reproducing speed is increased by 10% is subjected to an operation process in the key control processing part 30 so as to decrease the pitch by 165 (cent), it is possible to maintain the key to that at the time of the normal reproduction even though the reproducing speed is actually faster than that of the normal reproduction.

$$\begin{aligned} N &= 1200 \cdot [\log(10/100 + 1)]/\log 2 \\ &= 1200 \cdot [\log 1.1]/\log 2 \\ &= 1200 \cdot (0.0414/0.30103) \\ &\approx 165 \text{ (cent)} \end{aligned} \quad (4)$$

For example, let us assume that the rate of change is set to 10% by pushing the up button 40. At the time of the normal reproduction, the reproducing clock output from the PLL circuit 15 is 16.9344 MHz and the signal reproduction is made at the sampling frequency of 44.1 kHz. But by setting the rate of change to 10%, the reproducing clock output from the PLL circuit 15 in the step 45 shown in FIG. 4(B) becomes 18.62784 MHz and the reproducing speed increases by 10%, thereby also increasing the sampling frequency to 48.51 kHz. If the pitch mode is selected, the decision result of the step 46 is NO and the process ends. But if the tempo mode is selected and the decision result in the step 46 is YES, the following key control process is carried out in the step 47. That is, the increase (165 cent) of the key is calculated, and the audio data is subjected to an operation process so as to decrease the key by the amount of the calculated increase so as to return the key to that at the time of the normal reproduction. Furthermore, if the pitch is to be decreased by one tone from this state, the flat button 35 is pushed to decrease the key by one tone (200 cent). In this case, the key decreases by 200 cent by the operation process which is carried out on the audio data in the key control processing part 30. As a result, in this particular case, the reproducing speed is increased by 10% compared to that at the time of the normal reproduction and the key is decreased by one tone compared to that at the time of the normal reproduction.

Figure 7:
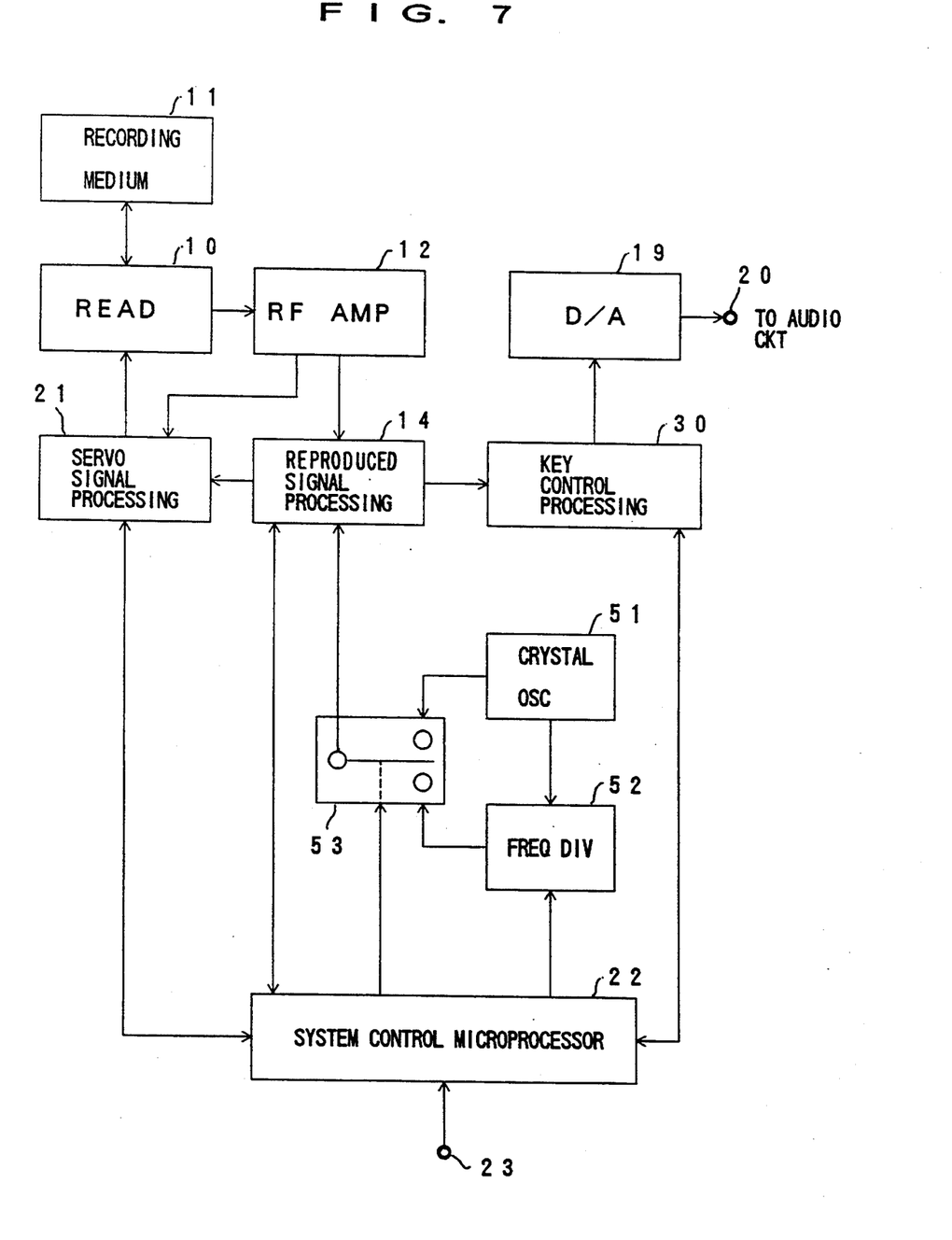
FIG. 7 is a system block diagram showing a second embodiment of the digital audio reproducing apparatus according to the present invention.

FIG. 7 shows a second embodiment of the digital audio reproducing apparatus according to the present invention. In FIG. 7, those parts which are the same as those corresponding parts in FIG. 2 are designated by the same reference numerals, and a description thereof will be omitted.

In this embodiment, a crystal oscillator 51, a frequency dividing circuit 52 and a switch 53 are provided in place of the PLL circuit 15 shown in FIG. 2. An output clock of the crystal oscillator 51 or an output clock of the frequency dividing circuit 52 is selected by the switch 53 in response to a control signal which is received from the system control microprocessor 22. The frequency dividing ratio of the frequency dividing circuit 52 is also controlled by a control signal from the system control microprocessor 22. The switch 53 selectively outputs the output clock of the crystal oscillator 51 during the normal reproduction, and selectively outputs the output clock of the frequency dividing circuit 52 if the reproducing speed is to be changed. The output clock of the switch 53 is supplied to the digital signal processing part 14. The key can be varied similarly to the embodiment described with reference to FIG. 2.

According to this embodiment, it is possible to minimize the deterioration of the audio characteristic due to the jitter of the clock or the like, because the reproducing clock is the output clock of the crystal oscillator 51 or the output clock of the frequency dividing circuit 52 which uses the output clock of the crystal oscillator 51.

Figure 8:
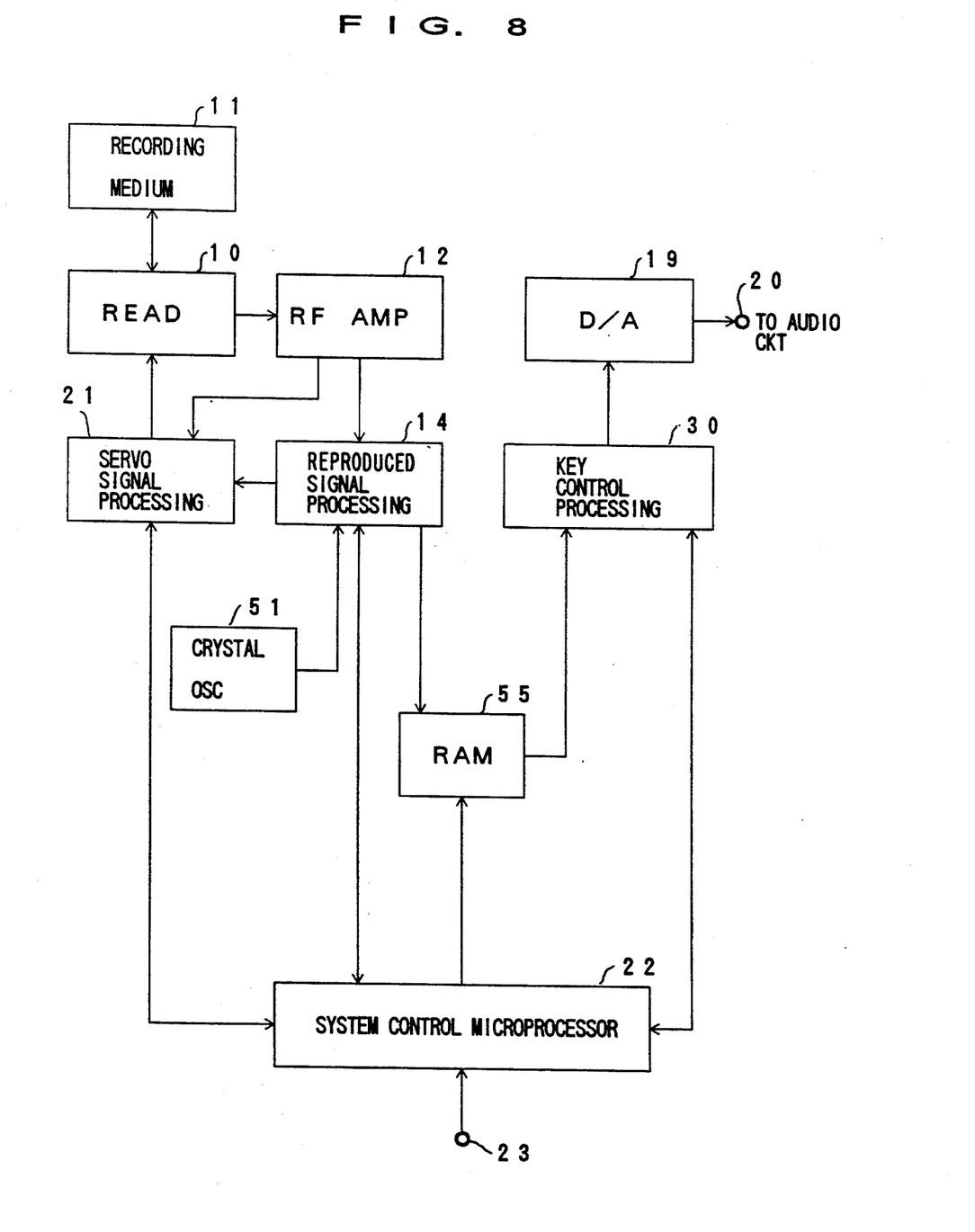
FIG. 8 is a system block diagram showing a third embodiment of the digital audio reproducing apparatus according to the present invention.

FIG. 8 shows a third embodiment of the digital audio reproducing apparatus according to the present invention. In FIG. 8, those parts which are the same as those corresponding parts in FIG. 2 are designated by the same reference numerals, and a description thereof will be omitted.

In this embodiment, a crystal oscillator 51 is used in place of the PLL circuit 15. The output clock of this crystal oscillator 51 is used as the reproducing clock of the reproduced signal processing part 14, and the reading speed, that is, the reproducing speed of the recording medium 11 is kept constant. The digital audio data output from the reproduced signal processing part 14 is written into a random access memory (RAM) 55 at a constant speed based on a write signal from the system control microprocessor 22. The digital audio data read from the RAM 55 based on a read signal from the system control microprocessor 22 is supplied to the key control processing part 30 wherein the digital audio data is subjected to the key control process. If the read speed with which the digital audio data is read from the RAM 55 is decreased (or increased), it is possible to decrease (or increase) the tempo. In this case, the key decreases (or increases) by the amount of the decrease (or increase) of the read speed, but the decreased (or increased) key can be returned to that at the time of the normal reproduction by carrying out the key control process in the key control processing part 30. The reproducing speed of the recording medium 11 is constant in this embodiment, but the reproducing speed can effectively be increased by setting the operation speed on the side of the system, that is, the operation speed of the reproduced signal processing part 14, to two times the operation speed at the time of the normal reproduction.

If the output clock of the crystal oscillator 51 is used as the reproducing clock and the read speed from the recording medium 11 is maintained constant in this embodiment, it is possible to prevent the read error from increasing even if the reproducing speed is increased.

In each of the embodiments described above, the present invention is applied to the CD player, and thus, the servo signal processing part 21 carries out the focus servo, the tracking servo, and the spindle servo for keeping the bit clock synchronization constant. However, if the present invention is applied to the DAT, the servo signal processing part 21 does not need to carry out the focus servo.

According to the present invention, it is possible to vary the speed of only the audio signal which is output, by varying the transmission rate, that is, the speed, of the digital audio data, and varying the key which changes by the change in speed. In addition, it is possible to vary only the key of the audio signal which is output by varying the key without varying the transmission rate.

Further, the present invention is not limited to these embodiments, but various variations and modifications may be made without departing from the scope of the present invention.

What is claimed is:

1. A digital audio reproducing apparatus comprising:
   clock generating means for generating a reproducing clock based on a first control signal;
   reproducing means, coupled to said clock generating means, for reproducing digital audio data from a recording medium, which is recorded with the digital audio data at a reproducing speed which is determined by said reproducing clock, based on said reproducing clock;
   key processing means comprising a digital signal processor, coupled to said reproducing means, for varying a key of the reproduced digital audio data which is output from said reproducing means based on a second control signal; and
   control means, coupled to said clock generating means and said digital signal processor, for generating the first and second control signals in response to an external instruction so that said digital signal processor outputs digital audio data which is reproduced at a desired reproducing speed and key, wherein said reproducing means and said digital signal processor operate independent of each other under the control of said control means.

2. The digital audio reproducing apparatus as claimed in claim 1, wherein said control means generates the first and second control signals which maintain the key constant regardless of the reproducing speed using a relation described by $$N = 1200 \cdot [\log(X/100 + 1)]/\log 2 \text{ (cent)}$$

where N denote the key changing quantity and X denotes a rate of change of the reproducing speed.

3. The digital audio reproducing apparatus as claimed in claim 1, wherein said control means generates the first and second control signals in response to the external instruction so that at least one of the reproducing speed and the key is variable in units of percentage thereof.

4. The digital audio reproducing apparatus as claimed in claim 3, wherein said control means generates the first and second control signals in response to the external instruction so that the key is also variable in units of half tone.

5. The digital audio reproducing apparatus as claimed in claim 3, wherein said control means generates the first and second control signals in response to the external instruction so that the key is also variable in units of 1 cent.

6. The digital audio reproducing apparatus as claimed in claim 1, wherein said clock generating means includes a phase locked loop circuit which generates the reproducing clock based on the first control signal.

7. A digital audio reproducing apparatus comprising:
clock generating means for generating a reproducing clock based on a first control signal;
reproducing means, coupled to said clock generating means, for reproducing digital audio data from a recording medium, which is recorded with the digital audio data at a reproducing speed which is determined by said reproducing clock, based on said reproducing clock;
key processing means comprising a digital signal processor, coupled to said reproducing means, for varying a key of the reproduced digital audio data which is output from said reproducing means based on a second control signal; and
control means, coupled to said clock generating means and said digital signal processor, for generating the first and second control signals in response to an external instruction so that said digital signal processor outputs digital audio data which is produced at a desired reproducing speed and key, wherein said clock generating means comprises:
a crystal oscillator generating a clock having a predetermined frequency;
a frequency dividing circuit, coupled to said crystal oscillator, frequency dividing the clock generated from said crystal oscillator by a frequency dividing ratio which is dependent on the first control signal; and
switching means, coupled to said crystal oscillator and said frequency dividing circuit, for selectively supplying one of the clock output from said crystal oscillator and a clock output from said frequency dividing circuit in response to a control signal which is output from said control means.

8. The digital audio reproducing apparatus as claimed in claim 7, wherein said control means generates the first and second control signals which maintain key constant regardless of the reproducing speed using a relation described by $$N = 1200 \cdot [\log(X/100 + 1)]/\log 2 \text{ (cent)}$$

where N denotes the key changing quantity and X denotes a rate of change of the reproducing speed.

9. The digital audio reproducing apparatus as claimed in claim 7, wherein said control means generates the first and second control signals in response to the external instruction so that at least one of the reproducing speed and the key is variable in units of percentage thereof.

10. The digital audio reproducing apparatus as claimed in claim 9, wherein said control means generates the first and second control signals in response to the external instruction so that the key is also variable in units of half tone.

11. The digital audio reproducing apparatus as claimed in claim 9, wherein said control means generates the first and second control signals in response to the external instruction so that the key is also variable in units of 1 cent.

* * * * *